Sept. 29, 1925.
J. C. MILLER
DETECTOR MECHANISM
Filed Sept. 19, 1923    2 Sheets-Sheet 2
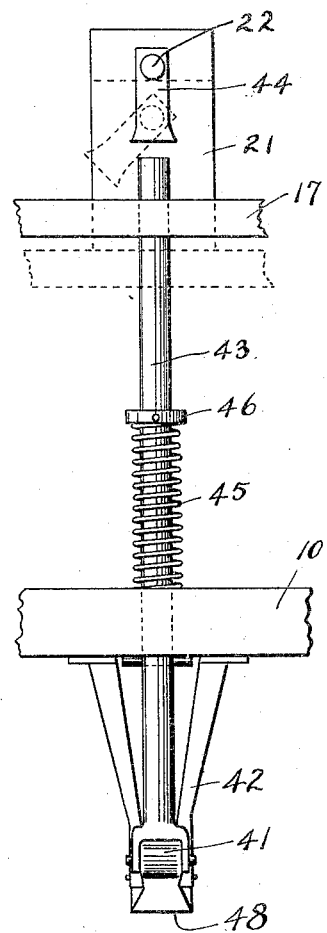
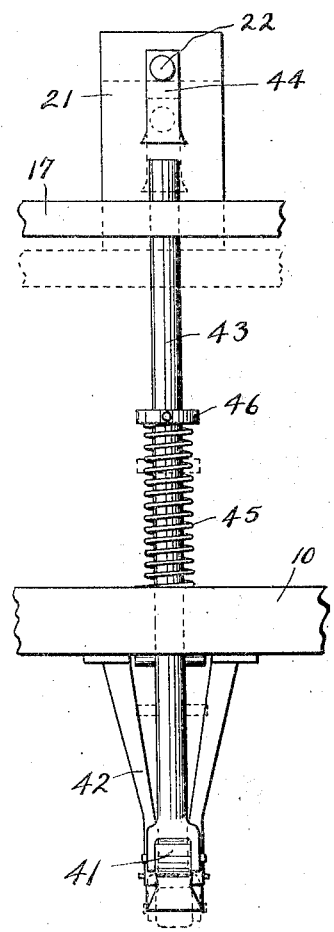
INVENTOR
John Charles Miller
BY Archibald Cox
ATTORNEY Patented Sept. 29, 1925.

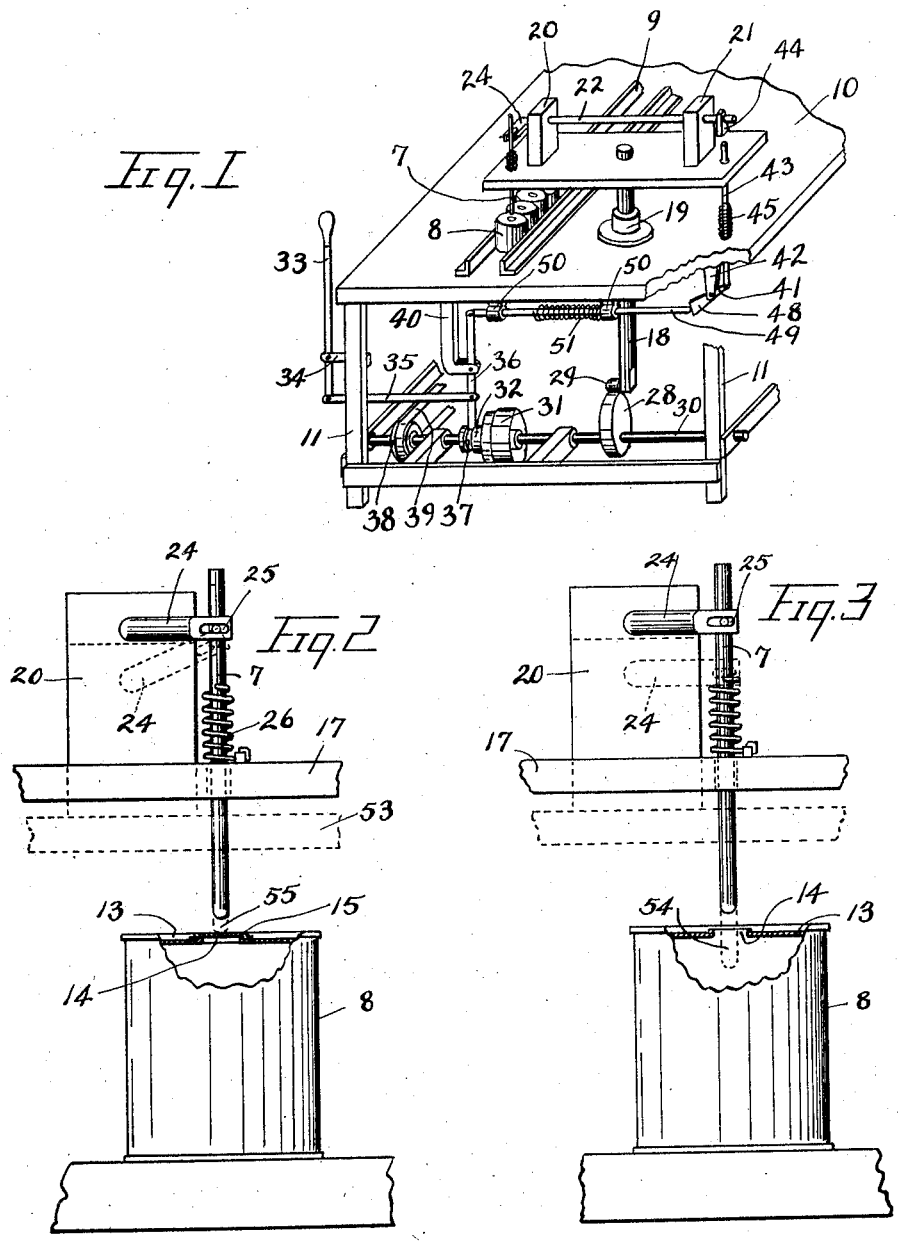

1,555,596

UNITED STATES PATENT OFFICE.

JOHN CHARLES MILLER, OF NEWPORT, NEW YORK, ASSIGNOR TO THE BORDEN COMPANY, OF NEW YORK, N. Y., A CORPORATION OF NEW JERSEY.

DETECTOR MECHANISM.

Application filed September 19, 1923. Serial No. 663,721.

*To all whom it may concern:*

Be it known that I, JOHN CHARLES MILLER, a citizen of the United States, residing in Newport, in the county of Herkimer, in the State of New York, have invented certain new and useful Improvements in Detector Mechanisms, of which the following is a specification.

The invention relates to an improvement in detector mechanisms and more particularly to an improvement in detector mechanisms adapted to detect the presence or absence of the covers on a series of cans or the like which are fed to a machine for performing one or more operations on the cans, such detector mechanism functioning to interrupt the operation of the machine and the devices associated with it in case a can is not provided with a cover.

The object of the invention is to improve upon the construction and arrangement of the parts of detector mechanism of this class in order to produce a more simple and efficient mechanism for detecting the presence or absence of the covers on a series of cans and for stopping the machine with which the detector mechanism is connected when the absence of a cover is detected. To this end the invention consists in the improved detector mechanism hereinafter described and particularly pointed out in the appended claims.

In the accompanying drawings illustrating the preferred form of the invention, Fig. 1 is a perspective view of the improved detector mechanism with the parts shown in normal operating position; Figs. 2 and 3 are side elevations, on an enlarged scale, of the detector and associated parts in position to detect the presence or absence of the cover on a can—the dotted lines in Fig. 2 indicating the positions of the parts when a cover is present and the dotted lines in Fig. 3 indicating the positions of the parts when the cover is absent; and Figs. 4 and 5 are side elevations of the detector-controlled lock rod which normally locks the clutch to the shaft which drives the detector mechanism and the machine with which it is connected—the dotted lines in Fig. 4 indicating the positions of the parts associated with the lock rod when the detector indicates the presence of a cover on the can, and the dotted lines in Fig. 5 indicating the position of the lock rod and the associated parts when the detector indicates the absence of a cover from the can.

The improved detector mechanism, as illustrated in the drawings, comprises a detector or finger 7 in the form of a vertically arranged pin which is mounted to be raised and lowered intermittently in timed relation with the feed of the cans 8 through the guides 9 fixed on the table 10 supported from the frame 11. The reciprocating movements of the detector 7 and the feed of the cans 8 are so related that when the center of a can is substantially opposite or in alignment with the detector, the latter is lowered or moved toward the can. If a cover is in place on the can, the downward movement of the detector is stopped and the operation of the detector mechanism and the machine with which it is connected is not interrupted. If, however, no cover is over the can, the detector continues its movement and the operation of the detector mechanism and the machine with which it is connected is stopped so that the coverless can may be removed. In the form of cans shown in Figs. 1, 2 and 3 the cans are provided with a cover proper 13 in which is a centrally arranged hole 14 adapted to be closed by a cap 15. For convenience of description the word cover is used to include either or both the cover proper 13 and the cap 15.

The reciprocating movements of the detector 7 toward and from the cans are imparted to it from a support or platform 17 secured to the upper end of a vertically disposed rod 18 mounted to slide in a sleeve 19 secured to the table 10. From the support 17 rise the uprights 20 and 21 in which is journaled a horizontally disposed shaft 22. On one end of the shaft 22 is mounted a bifurcated arm 24 which is connected with the upper end of the detector 7 by a pin and slot connection 25. A coiled expansion spring 26, the upper end of which is secured to the detector 7 and the lower end of which is secured to the support 17, holds the detector in normal position with relation to the support, as shown in Figs. 2 and 3. When the detector encounters a cover, as shown in dotted lines in Fig. 2, and the support 17 continues its downward movement, the spring 26 compresses so that when the support 17 rises again the spring restores the detector to normal position with respect to the support.

The support 17 and the parts connected with it are raised and lowered to move the detector toward and from the cans by means of a cam 28 which engages a roll 29 mounted on the lower end of the rod 18. The cam 28 functions to raise the support 17 which drops by gravity. The cam 28 is mounted on a shaft 30 journaled in the frame 11. On the shaft 30 is mounted a loose pulley 31 which may be driven from any convenient source of power. The pulley 31 is adapted to be connected with the shaft 30 to transmit power thereto by means of the clutch 32 which is thrown into locking engagement with the pulley 31 by the handle 33 mounted at 34 and connected by a link 35 with the lower arm of a lever 36 pivoted in a bracket 40. The lower end of the lever 36 is loosely received in a circumferential groove 37 in the hub of the clutch 32. Power is transmitted from the shaft 30 to the machine with which the detector mechanism is connected by means of a pulley 38 and belt 39. While the parts are held in the relative positions shown in Fig. 1 with the clutch in locking engagement with the pulley 31, the detector mechanism and the machine with which it is connected for operating on the cans after they pass through the detector mechanism, continue to perform their normal functions.

The clutch 32 is normally held in driving engagement with the pulley 31 by means of a lock block 41 which forms part of a stop mechanism. The lock block 41 is pivoted in a bracket 42 depending from the table 10 and is pivotally connected with the lower end of a vertically disposed lock rod 43 which passes loosely through the table 10 and the support 17. A coiled expansion spring 45 surrounding the rod 43 and interposed between the table 10 and a collar 46 secured to the rod 43 tends to push the rod upwardly and bring the lower end 48 of the lock block 41 in alignment with the outer end of a trip rod 49 pivotally connected at its other end with the upper end of the lever 36. The rod 49 slides in the ears 50 and the spring 51 tends to move the rod 49 to the right, viewing Fig. 1, to disengage the clutch 32 from the pulley 31. The upper end of the lock rod 43 of the stop mechanism is located in the normal path of movement of a hammer block 44 secured to one end of the shaft 22.

The operation of the detector mechanism may be briefly recapitulated as follows: The rise and fall of the support 17 is in timed relation with the feed of the cans so that as the support is lowered the detector 7 moves toward the can in alignment therewith to ascertain whether it is provided with a cover. If the cover is in place, it arrests the downward movement of the detector 7 as shown by the dotted lines 55, while the support continues to descend to the position indicated by the dotted lines 53. This causes the shaft 22 to turn in a counter-clockwise direction, viewing Fig. 2, and in a clock-wise direction, viewing Fig. 4. Thus the hammer block 44 avoids striking the upper end of the rod 43 of the stop mechanism and the operation of the detector mechanism and the machine with which it is connected is not interrupted. If now there is no cover on the can toward which the detector moves, the detector enters the can below the cover level, as shown by the dotted lines 54 in Fig. 3, and under these conditions the shaft 22 does not turn and so, as the support 17 descends, the hammer block 44 is caused to strike the upper end of the rod 43 and thereby depress it against the action of its spring 45 to disengage the end 48 of the lock block 41 from the rod 49. Thereupon the spring 51 moves the rod 49 to the right, disengaging the clutch 32 from the pulley 31 and thereby stopping the operation of the detector mechanism and the machine with which it is connected so that the defective can may be removed.

Having thus described the invention what I claim as new is:—

1. A detector mechanism for detecting the presence or absence of covers on a series of cans, comprising a detector mounted to move toward each can as it is fed past the detector, means for actuating the detector, a hammer connected with the detector and arranged to be moved thereby out of its path of travel when the detector encounters a cover, and a stop mechanism having a part located in the path of travel of the hammer to be actuated thereby when the detector does not encounter a cover.

2. A detector mechanism for detecting the presence or absence of covers on a series of cans, comprising a detector mounted to have reciprocating movements toward and from each can as it is fed forward past the detector, means to actuate the detector, a hammer connected with the detector and arranged to be moved out of its path of reciprocation when the detector encounters a cover, and a stop mechanism having a part located in the path of reciprocation of the hammer to be actuated thereby when the detector does not encounter a cover.

3. A detector mechanism for detecting the presence or absence of covers on a series of cans fed forward in timed relation with the movements of the detector mechanism, comprising a vertically arranged detector mounted to move toward each can as it is fed past the detector, a shaft with which the detector is connected adapted to be turned when the detector encounters a cover, a hammer mounted on the shaft, a support on which the shaft is mounted, means for raising and lowering the support, and a stop mechanism having a part located in the path of movement of the hammer to be actuated thereby when the detector does not encounter a cover.

4. A detector mechanism for detecting the presence or absence of covers on a series of cans, comprising a detector mounted to move toward and from each can in succession, means for actuating the detector, a stop mechanism for interrupting the operation of the detector mechanism, and means connected with the detector and having a normal path of movement when the detector encounters a cover and an abnormal path of movement when the detector does not encounter a cover for operating the stop mechanism when the detector does not encounter a cover.

5. A detector mechanism for detecting the presence or absence of covers on a series of cans, comprising a detector mounted to move toward and from each can in succession, a shaft with which the detector is connected adapted to be turned when the detector encounters a cover, a hammer mounted on the shaft, and a stop mechanism adapted to interrupt the operation of the detector, said stop mechanism having the part located in the path of movement of the hammer to be actuated thereby when the detector does not encounter the cover.

6. A detector mechanism for detecting the presence or absence of covers on a series of cans, comprising a detector mounted to move toward and from each can successively, a hammer connected with the detector and arranged to be moved thereby out of its path of movement when the detector encounters a cover, a clutch, and a stop mechanism arranged to throw out the clutch when the detector does not encounter a cover, said stop mechanism having a part holding the clutch in operative position and a second part arranged to be struck by the hammer to disengage the first part from the clutch when the detector does not encounter a cover.

7. A detector mechanism for detecting the presence or absence of covers on a series of cans, comprising a detector mounted to move toward each can as it is fed past the detector, a shaft with which the detector is connected, a hammer mounted on the shaft, a support on which the shaft is mounted, a cam for raising and lowering the support, said shaft being turned by the detector when the latter encounters a cover, a clutch, and a stop mechanism arranged to throw out the clutch when the detector does not encounter a cover, said stop mechanism having a lock for holding the clutch in operative position and a rod connected with the lock and arranged in the path of movement of the hammer to be actuated thereby to disengage the lock from the clutch when the detector does not encounter a cover.

8. A detector mechanism for detecting the presence or absence of covers on a series of cans, comprising a support, a cam for raising and lowering the support toward and from the cans, a shaft mounted on the support, a detector connected with the shaft and moved toward and from each can successively, the shaft being turned by the detector when the latter encounters a cover, a hammer mounted on the shaft, a clutch, and a stop mechanism adapted to throw out the clutch when the detector does not encounter a cover, said stop mechanism having a lock for normally holding the clutch in operative position and a part arranged to be struck by the hammer when the detector does not encounter a cover to disengage the lock from the clutch.

JOHN CHARLES MILLER.